United States Patent [19]

Tsuchiya

[11] Patent Number: 4,481,757
[45] Date of Patent: Nov. 13, 1984

[54] GREENSMOWER WITH POWERED, VERTICALLY ADJUSTABLE LAWN CONDITIONING ROLLER

[75] Inventor: Katsumi Tsuchiya, Tokyo, Japan
[73] Assignee: Bunton Company, Louisville, Ky.
[21] Appl. No.: 552,535
[22] Filed: Nov. 16, 1983
[51] Int. Cl.³ .............................................. A01D 43/02
[52] U.S. Cl. ...................................... 56/16.9; 56/249
[58] Field of Search .................. 56/249, 16.9, 14.4, 56/17.5, 17.6, 364, DIG. 12, 294

[56] References Cited

U.S. PATENT DOCUMENTS

| | | |
|---|---|---|
| 594,067 | 11/1897 | Curtis et al. |
| 1,163,745 | 12/1915 | Faulkner . |
| 1,397,555 | 5/1921 | Goodfellow . |
| 1,757,844 | 5/1930 | Pol . |
| 2,085,113 | 6/1937 | Miller .................... 56/294 |
| 2,209,309 | 7/1940 | George .................... 56/26 |
| 2,467,084 | 7/1949 | Cour ....................... 56/249 |
| 2,912,813 | 11/1959 | Ellsworth .............. 56/249 |
| 3,946,543 | 3/1976 | Templeton ............ 56/16.9 |

FOREIGN PATENT DOCUMENTS 256352 8/1926 United Kingdom .
536568 5/1941 United Kingdom .

Primary Examiner—Jay N. Eskovitz
Attorney, Agent, or Firm—David H. Semmes; Warren E. Olsen

[57] ABSTRACT

An improved powered lawn mower of the type comprising a longitudinally extending engine bed support frame, a transversely extending cutting reel and bed knife assembly carried by the frame, a transversely extending front roller carried by the frame and longitudinally spaced in front of the cutting reel, and a transversely extending lawn conditioning roller carried by the frame and spaced between the front roller and the cutting wheel. The improvements comprise a conditioning roller vertical adjustment means carried by the frame and operable to adjust the vertical height of the conditioning roller with respect to the grass and the pitch of the bed knife together with conditioning roller drive mechanism which is enclosed and pivotable upon vertical movement of the conditioning roller.

14 Claims, 5 Drawing Figures

GREENSMOWER WITH POWERED, VERTICALLY ADJUSTABLE LAWN CONDITIONING ROLLER

BACKGROUND OF THE INVENTION

1. Field of the Invention

A powered lawnmower of the type particularly adapted for mowing greens on golf courses, characterized by a driving roller and a cutting reel drive.

2. Brief Description of the Prior Art

Various prior lawnmowers have been based upon the concept of using a separate roller to raise up grass, prior to entry into a cutter reel mechanism. Prior art techniques for improving the cutting action of rotary reel type lawnmowers are represented by the patents, as follows:

| | |
|---|---|
| CURTIS, C. H. et al. | 594,067 |
| FAULKNER, W. P. | 1,163,745 |
| GOODFELLOW, A. | 1,379,555 |
| POL, J. B. | 1,757,844 |
| MILLER, J. J. | 2,085,113 |
| GEORGE | 2,209,309 |
| COUR C. J. | 2,476,084 |
| ELLSWORTH, I. W. | 2,912,813 |
| BARRACLOUGH, H. | GB 256,352 |
| FIDDLER, J. et al. | GB 536,568 |

The present invention teaches improvement in a powered lawnmower of the type comprising a transversely extending cutting reel and bed knife assembly carried by a frame, wherein the cutter reel has a transversely extending drive roller behind the cutter reel, a transversely extending front roller and a lawn conditioning device, in front of the cutter reel. Prior art devices have recognized that lifting of the grass, prior to entry into the cutter reel, ensures a higher quality cut, and various techniques to raise downtrodden grass are illustrated by the above-listed references.

However, the present invention additionally provides a powered lawn conditioning apparatus which is easily changed between a brush or a thatching mechanism, with very fine vertical adjustment of this conditioning roller possible through a pivoting, enclosed gear train assembly driven from the cutting reel. Prior art devices do not exhibit an adjustable and replaceable assembly which is so driven, and the prior art attempts also have not appreciated that exact vertical adjustments can be ensured by the relative positions of both a front roller and a powered conditioning roller, which might be a brush or thatching reel. The following, additional comments are offered with respect to each of these references, to assist an appreciation of the areas of improvement, hereinafter identified.

CURTIS et al. disclose a sickle bar-type mowing machine, wherein a cylindrical brush is mounted above a reciprocating set of rotary cutter blades, thereby to urge grass into the cutter blades and also clear clippings from the blades.

FAULKNER illustrates a sickle bar attachment device for a manual lawnmower, wherein a helical brush performs a grass raising function, prior to the reciprocating cutter bar.

GOODFELLOW illustrates another manual lawnmower attachment, wherein a brush is employed to revolve in a direction opposite to the direction of movement of the mower, thereby to sweep grass forward and upward, ahead of mower cutting blades. GOODFELLOW employs a one-way ratchet drive mechanism, and does not allow for a fine vertical adjustment of the brush.

POL teaches a stationary broom attachment, ahead of cutter blades, for the purpose of elevating grass prior to entry into the blade mechanism. POL represents a prior art device also configured especially for golf green or tee grasses, such as creeping bent, but with a structure unrelated to the approach taken in the present invention.

MILLER, like GOODFELLOW, teaches a non-adjustable rotary rake, driven from a set of mower wheels, for the purpose of lifting matted grass, prior to entry and cutting by a cutter wheel.

GEORGE illustrates a reel-type powered lawnmower having a set of brushes to lift only grass which is matted down by spaced apart, front support casters. GEORGE teaches brushes which rotate in the same direction as the cutter wheel, to bend grass back after having been compressed by separate front rollers. The brushes in GEORGE also are taught to rotate opposite to the direction preferred by MILLER and the present invention, though both senses of rotation are intended to accomplish the same lifting result.

The patents to COUR and ELLSWORTH illustrate soil aerating devices in broad combination with a lawnmower, though these devices are used to replace a rear or trailing roller. Neither COOR nor ELLSWORTH recognize a technique for brushing or thatching grass prior to its entry into a cutter reel.

The two Great Britain patents, in the names of BARRACLOUGH and FIDDLER et al., teach similar operations, though with slightly different embodiments. Each Great Britain patent illustrates a roller chain-driven brush which is configured to lift grass prior to it engaging a cutter bar. BARRACLOUGH illustrates one technique to adjust the position of the brush through a set screw (FIG. 2), and a brush driven in the same direction as the knife, though at an increased speed to throw soil and cut grass away from the area of the rollers. BARRACLOUGH, like GEORGE, employs two outboard rollers and does not perform a general raising function upon the grass. The FIDDLER et al. brush device is mounted upon a pair of adjustable plates, below the cutter bar and a front roller assembly, and the brush is driven in the same rotational direction as the wheels and the cutter bar.

In summary, the prior art generally recognizes that a lawn conditioning mechanism could be located between a front or leading roller and a rotating cutter wheel, to raise grass up prior to cutting. None of the prior art devices provides for the adjustment of both a front roller and a powered front lawn conditioning roller, that is driven through a pivotable, enclosed gear train which precludes misalignments and hazards common to exposed roller chains, for example.

SUMMARY OF THE INVENTION

A first object of the present invention is to provide a powered lawn mower with fine vertical adjustability for a transversely extending lawn conditioning roller, which is spaced between a front roller and a rotary cutting wheel. In order to achieve this object, the inventor has realized that the lawn conditioning roller must be adjustable for exact height relationships both to the bed knife of the powered rotary cutting reel, and to a steel front roller. In order accurately to position a conditioning roller (either of the brush or thatching wheel variety), the present invention teaches a technique for adjusting cutting heights for the lawn conditioning roller which can be made independent of the position of the reel blade, with respect to the ground reference.

A second object of the present invention is to provide a drive mechanism for such a powered lawn conditioning roller which will maintain an exact drive relationship with respect to the grass and the pitch of the bed knife of the roller for various vertical height adjustments. This object is achieved by a separate gear train which is pivoted about the center line of a cutting reel drive shaft, in response to a lawn conditioning roller adjustment, in the vertical direction.

A third object of the present invention is to provide a third clutch between the lawn conditioning roller and the cutting reel, so that a selective engagement of the lawn conditioning roller is possible without requiring operation of a first clutch for the main drive, or a second clutch for the cutting reel.

A fourth object of the present invention is a conditioning roller support design to enable easy replacement of a brush roller with a set of star wheels, to perform a thatching function. This object is achieved by using supports for two, spaced apart end bearings which are easily separable from the frame and move vertically within a frame, to enable quick replacement on the shaft of either a brush, or a set of thatching wheels.

The present improvements particularly are useful in a powered lawn mower of the type known as a "greensmower", which is configured to cut the very dense and low growing grasses found on golf tees and greens, for example. Such mowers comprise a longitudinally extending engine support bed frame, a superposed engine, and a transversely extending cutting reel and bed knife assembly, carried by the frame and connected to the engine by a cutting reel drive mechanism. Spaced longitudinally behind the cutting reel is a transversely extending drive roller, which both supports the mower and propels it along the grass.

The preferred embodiment greensmower has several advantageous design features. At each end of the drive roller is a quickrelease transport wheel, which is simply removed to allow the aluminum alloy drive roller mechanism to propel the device along the grass surface. The drive roller mechanism also is connected to the engine through a separate drive roller drive mechanism. Spaced longitudinally in front of the cutter reel is a transversely extending front roller, of a smaller diameter than the drive rollers, which is free-running and adjustable upon the frame. The front roller typically is made of stainless steel. Behind the front roller is a lawn conditioning roller, which also is transversely extending, and adjustable upon the frame. A separate lawn conditioning roller drive mechanism, and a vertical conditioning roller adjustment means, function together to enable a quick and accurate adjustment of the vertical height of this conditioning roller with respect to the grass and the pitch of the bed knife. An enclosed gear train selectively drives the lawn conditioning roller through a pivotable gear train arrangement from the cutting reel shaft. The rear roller drive mechanism and the cutting reel drive mechanism separately are driven.

Selective drive is accomplished by a first clutch, located between the engine and a differential gear case for enabling a conventional, total engine mower disconnect. A first gear case output shaft connects to the drive roller drive mechanism and a second drive output shaft connects to the cutting reel drive mechanism. A second clutch is located between the second drive output of the differential gear case and the cutting reel drive mechanism. A third clutch allows a selective power take-off from the cutting reel to the lawn conditioning roller.

The lawn conditioning roller is to be changed between a brush or a set of star wheels, for a thatching function. The lawn conditioning roller is held solely by bearing members at either end of a transversely extending shaft. The shaft is removable between bearing supports which are vertically adjustable, with respect to the frame, by independent height adjustment devices. The height adjustment devices allow the bearing end caps for the lawn conditioning roller exactly to be set, with respect to the cutter reel. The cutting reel pitch in turn similarly can be set with respect to the grass, since a second set of height adjustments are provided to raise or lower the end bearings for the free-running stainless steel front roller.

The powered, lawn conditioning roller, which is located between the stainless steel front roller and the reel, may support either a brush or a set of star wheels. In either case, the lawn conditioning roller preferably rotates in a direction opposite to the rotation of the cutting reel, so as to lift grass which has been downtrodden by the front roller, before that grass enters into the the cutter reel and bed knife. The conditioning roller may first be vertically adjusted in a relation to the pitch of the bed knife, and the front roller then raised (or lowered) to reduce (or increase) the pressure of the brush upon the grass surface. The third clutch means allows the conditioning roller to be disengaged, without affecting the lawn cutting or propelling action.

An additional feature of the preferred embodiment of the invention is the ability to ensure a very straight cut, since the drive roller mechanism comprises a pair of transversely spaced, aluminum alloy drive rollers. Each roller is powered separately from outboard gears which connect to a common drive roller drive mechanism through separate pinions. Equal power thereby is supplied to each drive roller through a first drive, which interconnects with the engine, through an intermediary differential gear. The drive mechanisms for each of the two drive rollers also are by an enclosed gear set. The drive between the engine and the differential drive case is conventional, and employs V belts and a first clutch to absorb shock, and generally control all power transmission. The intermediary, differential gear drive mechanism has a first shaft output to the drive roller drive mechanism which is controllable by the first clutch. A second drive shaft from the differential drive case inputs to a second clutch, which controls power to the cutting reel mechanism. An independent third clutch is located within a pivotable gear train housing between a main shaft of the cutter reel and the lawn conditioning roller, to allow cutting with or without a lawn conditioning. Hence, use of the lawn conditioning roller is a selective function of the cutting operation.

Further features and advantages of the present invention will become more apparent hereinafter, wherein a preferred embodiment of the present invention is disclosed with reference to the accompanying drawings.

DESCRIPTION OF THE PREFERRED EMBODIMENT

Figure 1:
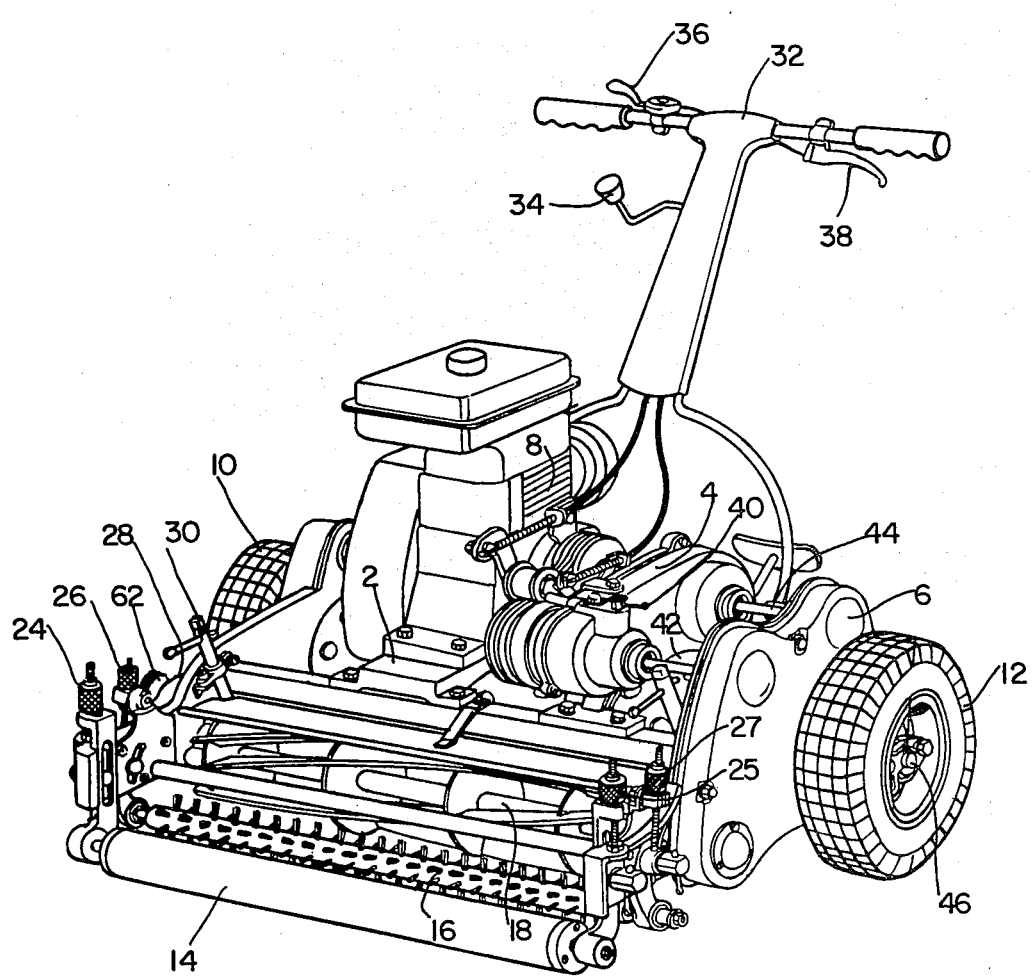
FIG. 1 is a front perspective view showing a preferred embodiment for a greensmower, according to the teachings of the present invention.
Figure 5:
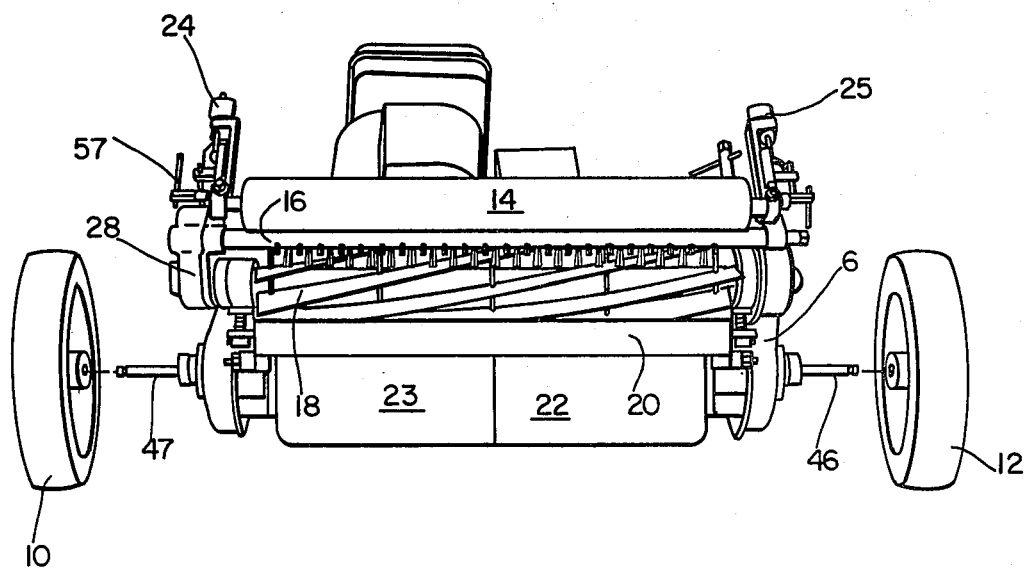
FIG. 5 is a bottom front perspective view of the present invention, showing the longitudinal relationships between front roller, lawn conditioning roller, cutting reel, and rear drive rollers.

FIGS. 1–5 illustrate a greensmower with an improved mechanism to drive a lawn conditioning roller, and also adjust a lawn conditioning roller with respect to both a cutting reel bed knife and a grass surface. FIG. 1 shows, in front perspective view, the main operating elements of the invention. A longitudinally extending engine bed support, 2, supports a conventional 4-cycle or other equivalent engine, 8. A first intermediary drive mechanism, 4, interconnects, in a reducing gear fashion, between the engine and both a cutting reel drive and a propelling roller drive. A left-side drive housing 6, encloses the distal ends of two output shafts from the intermediary drive 4. A similar, but smaller, housing is located on the right rear side of the mower bed, and covers a direct drive to the right drive roller, off a pinion at the right side of the first drive output shaft, 44. The first drive output shaft extends behind the engine and thereby enables a separate, direct drive to both the left transport wheel, 12, and the right wheel, 10. FIG. 5 shows a left outboard extension of an axle, 46, from within left roller, 22, which extends outboard to the removable left transport wheel, 12. A right outboard extension of a similar axle, 47, from within right roller 23, extends to the removable right transport wheel, 10.

Interconnection of the engine 18, to the intermediary or differential gear set, 4, is through a conventional set of V-belts and is controlled by a first clutch (not shown) which is actuated by lever 34. Engine speed control is by a throttle, 36. Both of these controls are conveniently mounted upon an extending yoke, 32, and a conventional brake control, 38, is provided further to prevent motion through the main V-belt interconnection between the engine and the intermediary drive. A first output shaft, 44, extends from a conventional set of differential speed reduction gears within the intermediary housing, 4, and drives directly each half of the roller drive assembly, as shown more completely in FIG. 5. A second drive output (not visible), from the differential set within the housing 4, is the input to a second clutch, which is actuated by a control handle, 40. This clutch per se is conventional, and need not further be described for an appreciation of the principles of the present invention. The output of the second clutch is through shaft, 42 which connects to a reduction gear train that is located within the forward portion of the left drive enclosure, 6, and drives the cutter reel, 18, in a counterclockwise direction, when viewed in elevation from the left side of the mower. The cutting reel drive is through a set of gears considered per se conventional, and is not further illustrated.

The present invention essentially derives from the ability vertically to adjust a lawn conditioning roller mechanism, 16, with respect to the engine bed, 2. That adjustment is both as a function of the absolute position of the roller above the grass level, and also with respect to the pitch of the reel, 18, and bed knife, 20. In order to achieve the adjustments as shown schematically in FIG. 3, a preferred mechanism for vertical adjustment is more particularly shown in FIG. 2.

Figure 2:
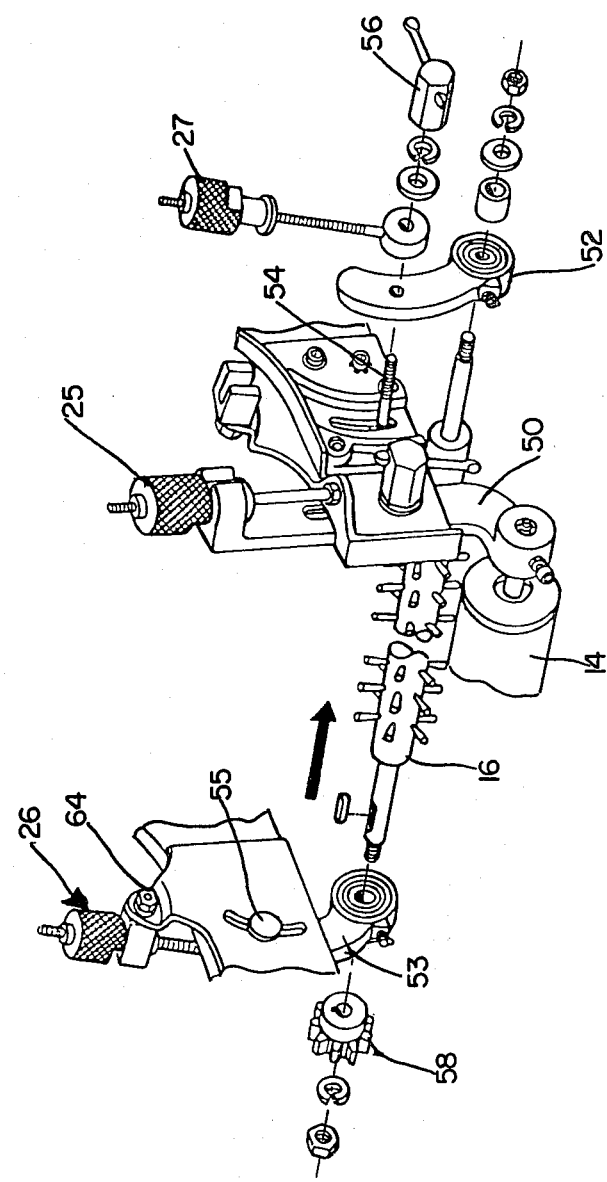
FIG. 2 is a front perspective explosion view, showing vertical adjustability of both a front roller and a lawn conditioning roller, according to the principles of the present invention.

In FIG. 2, a left bearing support for the free-wheeling, stainless steel, front roller, 14, is illustrated, together with left and right adjustment means for the lawn conditioning roller, 16. A right front roller adjusting knob, 24, is shown in FIGS. 1 and 5, but removed from FIG. 2 for clarity purposes.

A left front roller adjusting knob, 25, raises and lowers a left front roller bearing support arm, 50, through a sliding motion in a channel frame portion of the lawnmower bed. A the illustrated cap nut is loosened, the adjusting knob, 25, can be turned upon the threaded rod as shown, and raise or lower the left bearing support, 50, with respect to the engine frame. The stainless steel front roller, 14, extends transversely between two front roller end bearings. A quick dismounting of the stainless steel front roller, is possible since the arm, 50, is held removably against the channel only by the illustrated cap nut and a plate.

A similar front roller adjustment knob, 24, is provided on the right frame side, (FIG. 1). FIG. 2 also illustrates how another cap nut, 56, and a left conditioning roller adjustment knob 27 on a threaded rod are employed to fix a left conditioning roller vertical support arm, 52. This is shown in an explosion view to illustrate a normal disassembly with respect to the frame and the conditioning roller, 16. An equivalent conditioning roller vertical support arm adjustment structure is provided on the right side of the engine bed support frame, with a right conditioning roller adjustment knob and associated rod identified at 26. FIG. 2 also shows a guide support member, 64, upon the engine bed, and an inner view of the right sliding bolt and nut assembly, 55, which is a mirror image to the sliding bolt, 54, which provided for the left side.

Also shown in FIG. 2 is a pinion, 58, which is outboard of the right vertical bearing support arm, 53, and is keyed upon the lawn conditioning roller shaft. The pinion, 58, is driven through a novel, pivotable gear housing, as described hereinafter, and illustrated in FIG. 4.

Figure 3:
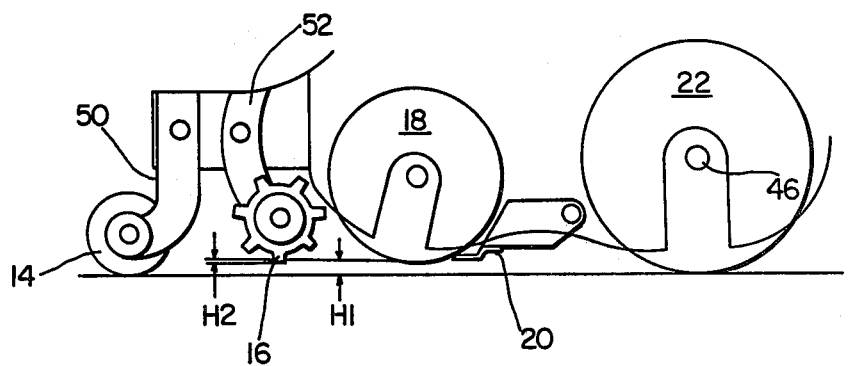
FIG. 3 is a schematic side view, showing the relationship between front roller and lawn conditioning roller adjustments, with respect to the grass and the bed knife of the cutting reel.

Having described the structure to enable vertical adjustments of both the front roller and the lawn conditioning roller, FIG. 3 illustrates, in schematic form, how the respective two left side end bearing supports, 50, 52, can cooperate to enable two height adjustments to be made. The first height adjustment, H1, positions the bed knife and the reel, 18, with respect to a ground reference. As the front roller, 14, is raised or lowered, the entire lawnmower will pivot about the rear drive axle, 46. A second, independent vertical adjustment is provided by the vertical movement of the two conditioning roller bearing support arms, so that a dimension, H2, can be provided between the conditioning roller and the bed knife of the cutting reel. Hence, a loosening of the conditioning roller cap nut, holding each bearing support arm, allows the bolts 54, 55 freely to slide so H1 first can be set for example, at 5 mm. For thatching, as shown in FIG. 3, the height H2 should be adjusted to approximately 1 mm less than the cutting height; if H1 is set at 5 mm, H2 should be adjusted to be 1 mm closer to the grass than the reel blade bed knife.

Of course, such values will depend significantly on turf grass and operating conditions and the present invention allows a very fine adjustment of both the front roller and the lawn conditioning roller to accomodate such various conditions.

If a brush roller is used to replace the thatching star wheels illustrated in FIG. 3, the brush roller will tend to be approximately 1 mm above the bed knife height, i.e., the brush roller need not be below the bed knife to be effective, but can be adjusted to a significantly different relative position, with respect to the pitch of the bed knife.

Figure 4:
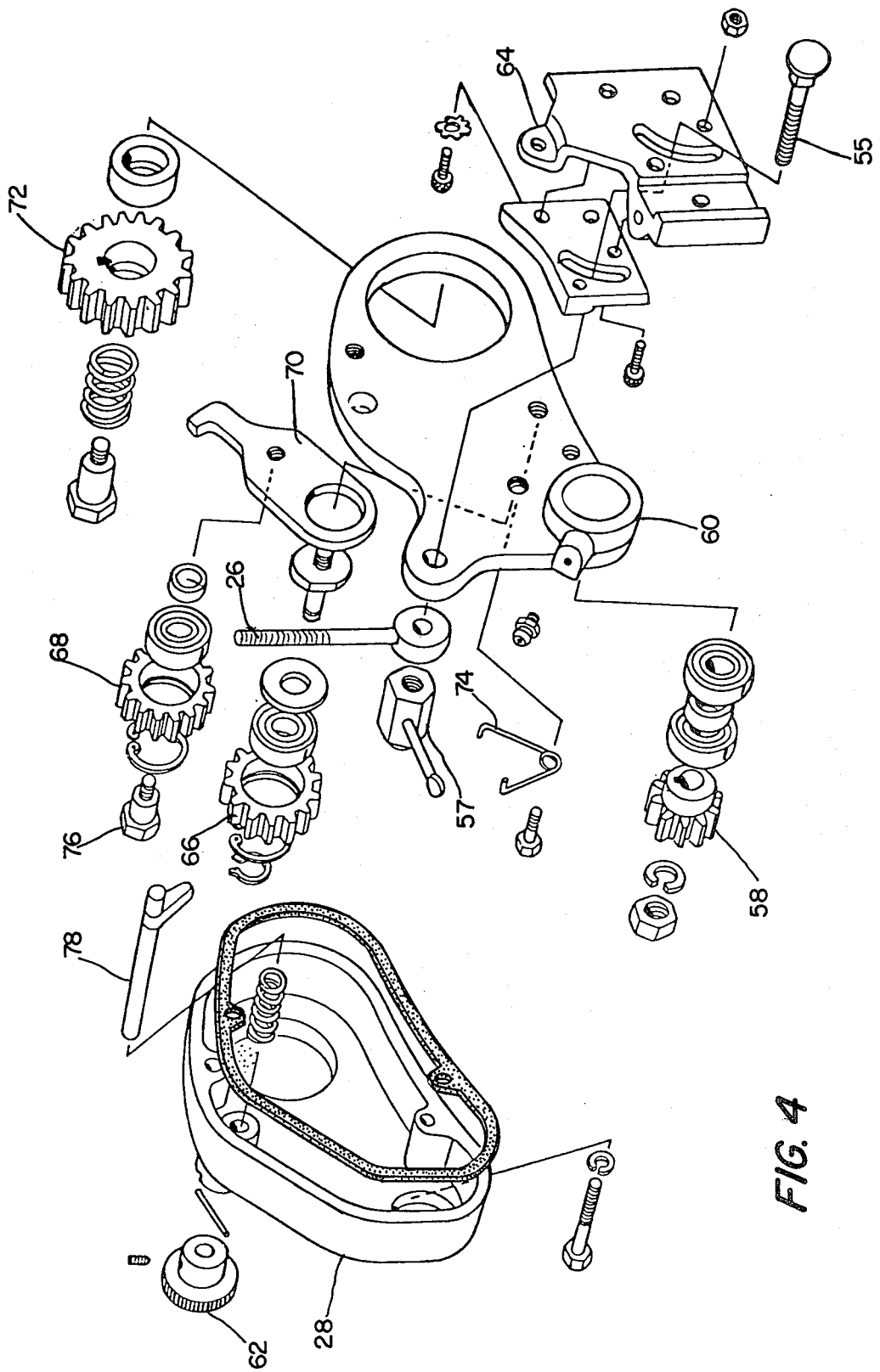
FIG. 4 is an explosion, perspective view of a preferred lawn conditioning roller drive mechanism, illustrating the pivotable enclosed gear train and a third clutch, according to the present invention.

FIG. 4 illustrates the closed gear train which comprises the conditioning roller drive mechanism, and selectively drives the conditioning roller by a power take-off from the cutting reel drive shaft. The gear train housing, 28, (shown in FIG. 1 and also in explosion view, in FIG. 4), comprises a housing adapted to be pivoted about the center line of the cutting reel roller shaft which has at its right outboard end, a drive pinion, 72. Between the cutting reel drive shaft pinion 72 and the driven conditioning roller pinion, 58, a third clutch mechanism is disposed to control the drive sequence and is illustrated in FIG. 4. A right cap nut adjustment, 57, (FIGS. 4 and 5) cooperates with the right conditioning roller adjustment bolt, 55, to enable pivoting of the entire housing, 28. An inner, right side conditioning gear drive plate, 60, functions as a housing surface, further to support the bearing for the drive pinion, 58, and to enable the housing, 28, to pivot. The pivot is at the axis of the cutting reel pinion, 72, attached to the right outboard end of the shaft for the cutting reel, 18. A third clutch mechanism between drive pinion, 72, and the driven pinion, 58, is accomplished by a idler pivot arm, 70, which is moved by an engagement roll pin, 78, by rotating the third clutch drive engagement knob, 62. Idler gears 66 and 68 provide a gear train, as shown, and the entire mechanism is movable with reference to a portion of the engine bed, 64, as further illustrated in FIGS. 2 and 4. Rotation of the third clutch engagement knob, 62, engages the idler, 68, into the driving pinion, 72, through the movement of the idler pivot arm, 70. This clutch motion is independent of the relative position of the housing, 28, with respect to the frame, 64.

The bottom, front perspective view of FIG. 5 further illustrates how the lawn conditioning gear drive mechanism, 28, is positioned with respect to the mower reel, 18, and the front conditioning roller, 16. Vertical motion of the housing 28 follows a loosening of the right lawn conditioning adjustment cap nut, 57, and movement of the right conditioning roller vertical adjustment knob, 26. Also shown in FIG. 5 is the left rear roller, 22, and the right rear roller, 23, which independently are driven off of gear trains, respectively within a left gear enclosure, 6, and a right rear enclosure which accepts the right, outboard end of the common drive shaft, 44. Each roller drive has a gear reduction connection to a driven pinion on the outboard ends of each roller drive axles, 46 and 47.

Having shown and described a preferred embodiment of my invention, it is to be understood that the invention is to be limited solely by the scope of the appended claims.

I claim:

1. In a powered lawn mower of the type comprising a longitudinally extending engine bed support frame, a superposed engine, a transversely extending cutting reel and bed knife assembly carried by the frame, a cutting reel drive mechanism connecting the reel to the engine, a transversely extending drive roller means carried by the frame and longitudinally spaced from the cutting reel for supporting and propelling the mower, a drive roller drive mechanism connecting the drive roller means to the engine, a transversely extending front roller carried by the frame and longitudinally spaced in front of the cutting reel, a transversely extending lawn conditioning roller carried by the frame and spaced between the front roller and the cutting wheel, and a conditioning roller drive mechanism, the improvements which comprise a conditioning roller adjustment means carried by a frame and operable to adjust the vertical height of the conditioning roller with respect to the grass and the pitch of the bed knife and a conditioning roller drive mechanism further comprising an enclosed gear train means to drive selectively the conditioning roller from the cutting reel drive mechanism.

2. In a powered lawn mower according to claim 1, the further improvement in the gear train means of a housing adapted to be pivoted about the centerline of a cutting reel drive shaft, in response to a vertical movement of said conditioning roller adjustment means.

3. In a powered lawn mower according to claim 2, the further improvement of a conditioning roller, pivoting gear train means which comprises a drive pinion fixed to an outboard end of said cutting reel drive shaft and a driven pinion fixed to an outward end of a shaft connected to said conditioning roller, at least one idler gear operable to engage between the drive and driven pinion and a conditioning roller drive means operable selectively to make said drive engagement.

4. In a powered lawn mower according to claim 3, the further improvement wherein said pivoting gear means are pivotable through an interconnection with said conditioning roller adjustment means whereby said housing pivot and said conditioning roller vertical movement are responsive to a common adjustment.

5. In a powered lawn mower according to claim 1, the further improvement of a drive roller means which comprises a pair of transversely spaced drive rollers, each separately driven from a common drive shaft of the drive roller drive mechanism.

6. In a powered lawn mower according to claim 5, wherein the roller drive mechanism common drive shaft has either end located within an enclosed gear housing, which further comprises gear connections between said common drive shaft and pinions outward of each drive roller.

7. In a powered lawn mower according to claim 5, wherein each of said transversely extending drive rollers has an outboard shaft portion to which a transport wheel, of larger diameter than the drive roller, is adapted removably to be connected.

8. In a powered lawn mower according to claim 1, the further improvement of the drive roller means, cutting reel and front roller having the same sense of rotation and the lawn conditioning means having the opposite sense of rotation.

9. In a powered lawn mower according to claim 1, the further improvement of a first clutch means located between the engine and an intermediary gear case which, in turn, has a first drive output to the drive roller drive mechanism and a second drive output to the cutting reel drive mechanism, a second clutch means located between the second drive output and the cutting reel drive and a third clutch means located between the conditioning roller drive means and the cutting reel.

10. In a powered lawn mower according to claim 9, wherein said third clutch is located within said conditioning roller enclosed gear train means and further comprises an actuating arm adapted to interpose at least one idler gear into an engagement between a drive pinion connected to said cutting reel drive shaft and a driven pinion connected to a shaft supporting, and in driving connection to, said conditioning roller.

11. In a powered lawn mower according to claim 1, the further improvement of a conditioning roller which comprises a shaft and a brush roller that is removable from said shaft which is supported between transversely spaced bearing supports, said brush being replaceable on said shaft by a set of transversely disposed thatching blades.

12. In a powered lawn mower according to claim 11, the further improvement of a conditioning roller adjustment means further comprising at least one vertically extending conditioning roller support arm adapted for vertical movement within a first vertically extending channel in said frame at a location proximate said conditioning roller, said conditioning roller support arm having a bearing proximate its lower end that is adapted to support said conditioning roller shaft, and means to fix said conditioning roller support arm within said first channel.

13. In a powered lawn mower according to claim 12, the further improvement of a front roller adjustment means further comprising at least one vertically extending front roller support arm adapted for vertical movement within a second vertically extending channel in said frame at a location proximate said front roller, said front roller support arm having a bearing proximate its lower end that is adapted to support a shaft of said front roller, and means to fix said front roller support arm within said second channel.

14. In a powered lawn mower according to claim 13, wherein said means to fix the conditioning roller support arm and the front roller support arm each comprise vertically extending threaded rods connected to a support portion of each of said conditioning roller and front roller support arms and an associated adjustment knob which engages upon each of said rods and bears against a portion of said frame to enable exact vertical adjustment of each support arm.

* * * * *